United States Patent [19]
Legge

[11] 3,970,196
[45] July 20, 1976

[54] METHOD AND APPARATUS FOR SECURING A BICYCLE ON A BICYCLE RACK

[76] Inventor: Earl N. Legge, 11511 - 28th Ave. NE., Seattle, Wash. 98125

[22] Filed: May 23, 1974

[21] Appl. No.: 472,734

[52] U.S. Cl................................. 211/5; 70/19; 70/235
[51] Int. Cl.²................................ E05B 73/00
[58] Field of Search............... 70/19, 57, 58, 61, 62, 70/233, 234, 235; 211/5, 17, 19, 22; 224/42.03 B, 29 R; 214/450; 248/203

[56] References Cited
UNITED STATES PATENTS

| | | | |
|---|---|---|---|
| 577,808 | 2/1897 | Myers | 211/5 |
| 586,681 | 7/1897 | Douglas | 211/19 |
| 640,736 | 1/1900 | Biester | 211/19 |
| 3,041,544 | 10/1974 | Berger | 224/42.03 B |
| 3,138,260 | 6/1964 | Tedrick | 211/5 X |
| 3,749,295 | 7/1973 | Palmer | 224/29 R |

FOREIGN PATENTS OR APPLICATIONS 421,056  5/1947  Italy .................................. 70/19

Primary Examiner—Robert L. Wolfe
Attorney, Agent, or Firm—Thomas W. Secrest

[57] ABSTRACT

This invention is directed to a method and an apparatus for securing a bicycle to a bicycle rack. In particular, this invention may be used to secure bicycles to a bicycle rack which mounts on a car bumper.

5 Claims, 7 Drawing Figures

METHOD AND APPARATUS FOR SECURING A BICYCLE ON A BICYCLE RACK

BACKGROUND OF THE INVENTION

Bicycling has become an increasingly popular pastime. People are cycling both for leisure and for the purpose of competition in sports events. The bicycle's utility can be expanded by carrying it on a bicycle carrying rack mounted on the cyclist's auto. By so carrying his bicycle he may drive to the area through which he wishes to cycle. As a result, he need not consume valuable time required to cycle to the desired area, but can more profitably bicycle in the desired area.

With some variation, the conventional bicycle carrying rack is comprised of four parts: (1) the bumper mount which attaches to the auto's bumper; (2) two vertical support struts which attach to the bumper mount at points approximately 2 feet apart and which stand approximately 3 feet above the bumper; (3) a rail connecting the upper parts of the two vertical supporting struts; and (4) two horizontal bicycle mounting bars, each of which attaches at the top of one of the vertical support struts pointing away from the auto in a direction approximately perpendicular to the bumper and parallel to each other.

Each bicycle mounting bar has two downward bends or positioning bends. The rack holds two bicycle frames with a frame resting in a positioning bend in each bicycle mounting bar. The positioning bends in the two bicycle mounting bars are aligned so that the bicycle frames rest, approximately, parallel to each other and to the auto bumper and, because of the height at which the frames are held, the bicycle clears the ground at a safe distance.

GENERAL DESCRIPTION OF THE INVENTION

The existing bicycle racks, however, have proved deficient in at least two respects: First, they do not provide adequate means for keeping the bicylce firmly in place while the auto is traveling, and, second, they do not provide adequate protection against possible theft of the bicycle while the auto is at rest and left unattended. It is intended that this invention remove these deficiencies. To do so, the invention comprises a formed metal security retainer and locking apparatus to be used in conjunction with a cyclist's bicycle carrying rack as a method of securing the bicycle to the rack.

OBJECTS AND ADVANTAGES OF THE INVENTION

Accordingly, it is an object of the present invention to provide a method and apparatus which will, completely, secure the bicycle to the bicycle rack; it is another object of the present invention to provide a durable but, relatively, inexpensive method and apparatus for obtaining such security; it is a further object of this invention to provide a method and apparatus which will both protect against possible bicycle theft and protect against loss by unexpected dislodging during travel; an additional object of this invention is to provide a method and an apparatus for readily positioning a bicycle on a bicycle carrying rack and for readily removing a bicycle from a bicycle carrying rack.

These and other important objects and advantages of the invention will be more readily brought forth from the following specific description of the invention, the appended claims and the accompanying drawings.

THE DRAWINGS

SPECIFIC DESCRIPTION OF THE INVENTION

The method and apparatus of this invention for securing bicycle frames to an existing bicycle rack is comprised of a bicycle security retainer and a locking device to be used in conjunction with the retainer.

The retainer rests on top of the bicycle frames and the horizontal mounting bar of an existing bicycle rack. It acts to keep the frames and bicycles in place on the rack.

The locking device may be a padlock or a bolt and nut or other device. It acts to keep the retainer in place.

Figure 1:
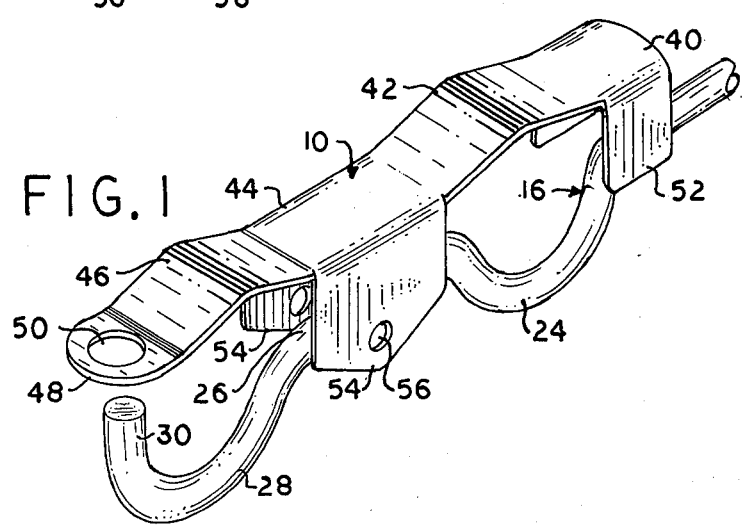
FIG. 1 is an isometric view of the bicycle retainer positioned slightly above the bicycle mount bar.

The retainer 10, as shown in FIG. 1, is fashioned from one piece of metal. It is so formed as to accommodate bicycle frames 12 and 14 (see FIG. 2) and slip over the horizontal mounting bar 16.

As previously, explained, the bicycle mounting rack comprises the vertical support struts 18 and the rail 20 connecting together the two support struts 18.

The bicycle mounting bar 16 comprises an inner threaded end 22, a first downward bend or a first positioning bend 24, an upward bend 26, a second downward bend or a second positioning bend 28, and an upwardly directed end 30.

The bicycle mounting bar 16 is attached to the bicycle mounting rack by the inner threaded end 22 projecting into a passageway 32 in the strut and an aligned passageway 34 in the rail and by lock nuts 36 on the threaded end 22 and on opposite sides of the bicycle mounting rack.

The bicycle security retainer 10 may be of unitary construction and may be considered to be a strap with depending parts for mounting on the bicycle mounting bar 16. The bicycle security retainer 10 may be considered to have a flat, inner part 40 which is positioned near the bicycle mounting rack. Then, upon going from the bicycle mounting rack, the security retainer rises into a curved portion 42 which fits over the frame 14 and over the positioning bend 24. Then, 42 flows into the central flat portion 44. The central flat portion then rises into the outer curved portion 46 which fits over the frame 12 and over the positioning bend 28. Then, 46 forms the outer flat portion 48. In 48 there is a hole or passageway 50 for receiving the upwardly directed end 30 of the bicycle mounting bar 16.

That portion 40 of the security retainer bends downwardly on each side into depending legs 52. The depending legs 52 overlie part of the threaded end of the bicycle mounting bar 16.

Figure 6:
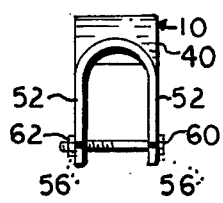
FIG. 6 is a view of one end of the bicycle security rettainer.
Figure 7:
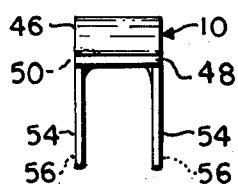
FIG. 7 is an end view of the other end of the bicycle security retainer.

The central flat portion 44 bends downwardly on each side into depending legs 54. In each of the depending legs 54 there is a hole or passageway 56. The holes or passageways 56 are aligned for receiving a lock 58, see FIGS. 2 and 5, or a bolt and nut combination 60 and 62, see FIG. 6.

Figure 2:
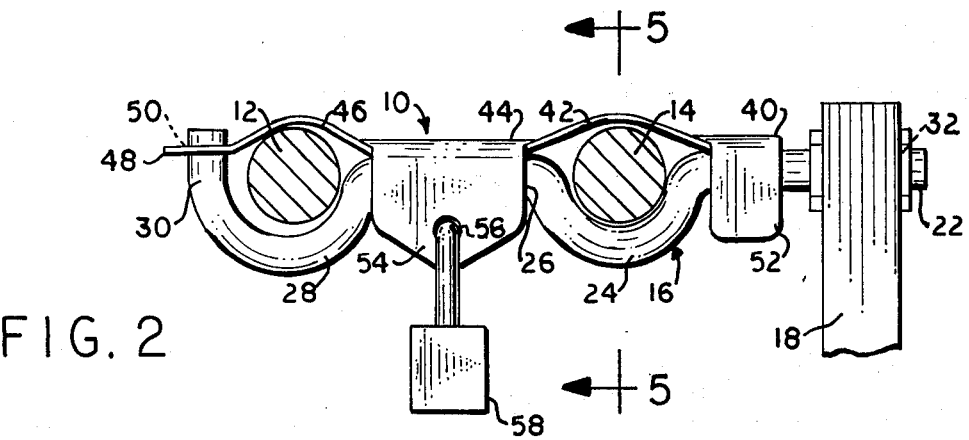
FIG. 2 is an elevational view showing the bicycle security retainer in place and securing two bicycle frames, in cross-section, in the positioning loops in the bicycle mounting bar.
Figure 3:
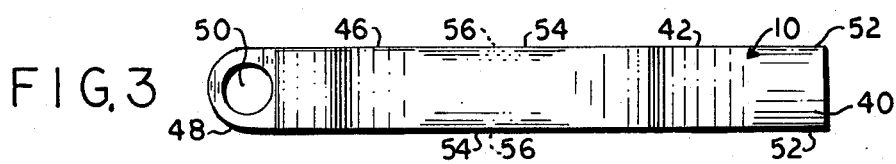
FIG. 3 is a top plan view showing the bicycle security retainer.
Figure 4:
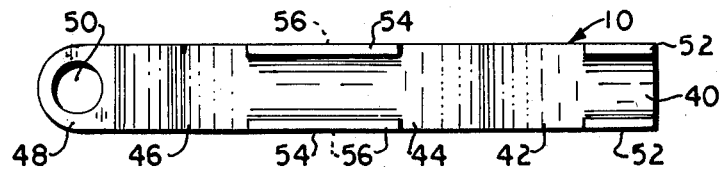
FIG. 4 is a bottom plan view of the bicycle security retainer.
Figure 5:
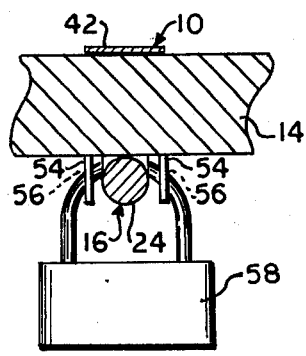
FIG. 5 is a sectional view looking at the frame of the bicycle and a lock positioning the bicycle security retainer to the bicycle mounting bar.

In operation, see FIGS. 1, 2, and 5, it is seen that the bicycle can be placed in the positioning bends 24 and 28 so that frame 14 is in positioning bend 24 and frame 12 is in positioning bend 28. Then, the bicycle security retainer 10 is positioned with a depending leg 52 over the threaded end of the bicycle retaining bar 16 and the depending leg 54 over the central portion 26 of the bicycle mounting bar 16, and with the upwardly directed end 30 projecting through the passageway 50. Then, the lock 58 can be inserted through the passageways 56 in the depending legs 54 so as to definitely position the bicycle security retainer 10 on the bicycle mounting bar 16. With the locking of the lock 58, it is difficult to remove the bicycle from the bicycle mounting bar 16 of the bicycle mounting rack.

If it is not necessary to lock the bicycle onto the bicycle mounting bar 16, then a bolt and nut combination 62 may be used to securing position the bicycle while traveling or while moving.

From the foregoing, it is seen that I have provided a bicycle security retainer which can function as a lock and positioning means for bicycles on a bicycle carrier rack or can function as a positioning means on a bicycle carrier rack. The bicycle mounting bar 16 is, generally, coated with percussive coating such as a vinyl coating. The vinyl coating has considerable friction and this friction assists in positioning the bicycle frames 12 and 14 in the positioning bends 28 and 24. This is of value while an automotive vehicle is moving as the bicycle frames 12 and 14 cannot, readily, move on the bicycle rack. Also, the bicycle security retainer 10 prevents the bicycles from popping out of or jumping out of the bicycle mounting bar 16. Also, it is seen that the bicycle security retainer 10 can be manufactured relatively inexpensively.

Having presented my invention, what I claim is:

1. A combination of a bicycle mounting bar on a bicycle rack and a bicycle security retainer wherein said bicycle mounting bar comprises:
   a. an inner end connecting with said bicycle rack;
   b. a first positioning bend connecting with said inner end;
   c. an upward bend connecting with said first positioning bend;
   d. a second positioning bend connecting with said upward bend;
   e. an upwardly directed bend connecting with said second positioning bend;
   f. said bicycle security retainer comprises a first portion for fitting over said first positioning bend;
   g. said bicycle security retainer comprises a central portion connecting with said first portion;
   h. said bicycle security retainer comprises a second portion for fitting over said second positioning bend; and,
   i. said bicycle security retainer comprises an end portion for cooperating with said upwardly directed bend to assist in positioning said bicycle security retainer on said bicycle mounting bar.

2. A combination of a bicycle mounting bar on a bicycle rack and a bicycle security retainer according to claim 1 and comprising:
   a. said bicycle security retainer having a passageway for fitting with said upwardly directed end to assist in positioning said bicycle security retainer on said bicycle mounting bar.

3. A combination of a bicycle mounting bar on a bicycle rack and a bicycle security retainer according to claim 1 and comprising:
   a. said central portion bending into two spaced-apart legs for fitting over said upward bend to assist in positioning said bicycle security retainer on said bicycle mounting bar.

4. A combination according to claim 1 and comprising:
   a. said bicycle security retainer comprises an inner portion which fits over said inner end; and,
   b. said inner portion bends into two spaced-apart legs to assist in positioning said bicycle security retainer on said bicycle mounting bar.

5. A combination according to claim 2 and comprising:
   a. said central portion bending into two spaced-apart legs for fitting over said upward bend to assist in positioning said bicycle security retainer and said bicycle mounting bar;
   b. said bicycle security retainer comprises an inner portion which fits over said inner end; and
   c. said inner portion bends into two spaced-apart legs to assist in positioning said bicycle security retainer on said bicycle mounting bar.

* * * * *